United States Patent [19]

Togino

[11] Patent Number: 5,790,311
[45] Date of Patent: Aug. 4, 1998

[54] OCULAR OPTICS SYSTEM HAVING AT LEAST FOUR REFLECTIONS OCCURRING BETWEEN CURVED SURFACES

[75] Inventor: Takayoshi Togino, Koganei, Japan

[73] Assignee: Olympus Optical Co., Ltd., Tokyo, Japan

[21] Appl. No.: 784,393

[22] Filed: Jan. 17, 1997

[30] Foreign Application Priority Data

Jan. 19, 1996 [JP] Japan ................................. 8-007363

[51] Int. Cl.$^6$ ................................................. G02B 27/14
[52] U.S. Cl. ........................... 359/630; 359/631; 359/633
[58] Field of Search ............................ 359/630, 631, 359/633, 637; 345/7, 8

[56] References Cited

U.S. PATENT DOCUMENTS

| | | | |
|---|---|---|---|
| 4,026,641 | 5/1977 | Bosserman et al. | 359/869 |
| 5,157,549 | 10/1992 | Suzuki et al. | 359/633 |
| 5,249,081 | 9/1993 | Rogers | 359/633 |
| 5,329,158 | 7/1994 | Tosaki | 359/633 |
| 5,429,612 | 7/1995 | Ingleton | 359/630 |
| 5,453,877 | 9/1995 | Gerbe et al. | 359/633 |
| 5,506,728 | 4/1996 | Edwards et al. | 359/629 |

FOREIGN PATENT DOCUMENTS

| | | |
|---|---|---|
| 687 932 | 12/1995 | European Pat. Off. . |
| 2-297516 | 12/1990 | Japan . |
| 3-101709 | 4/1991 | Japan . |

*Primary Examiner*—Georgia Y. Epps
*Assistant Examiner*—Ricky Mack
*Attorney, Agent, or Firm*—Cushman Darby & Cushman IP Group of Pillsbury Madison & Sutro

[57] ABSTRACT

The invention relates to an ocular optics system which forms no intermediate image, is reduced in terms of size and weight with well-corrected aberrations, and is best suited for use on face- or head-mounted image display devices, and provides an ocular optics system 7 comprising three juxtaposed optical surfaces 3, 4 and 5, wherein a space defined by three optical surfaces 3, 4 and 5 is filled with a transparent medium having a refractive index greater than 1, at least two optical surfaces 3 and 4 of these three optical surfaces are defined by curved surfaces concave on a pupil position side of the optics system, and at least four reflections occur between curved surfaces 3 and 4.

22 Claims, 5 Drawing Sheets

OCULAR OPTICS SYSTEM HAVING AT LEAST FOUR REFLECTIONS OCCURRING BETWEEN CURVED SURFACES

BACKGROUND OF THE INVENTION

The present invention relates generally to an ocular optical system, and more particularly to an ocular optical system intended for use with a head- or face-mounted image display device which is mounted on the head or face of the user to project images into the user's eyeballs.

In recent years, helmet or goggle-type of head-mounted or face-mounted image display devices have been developed for virtual reality purposes or with a view to allowing individuals to enjoy wide-screen viewing.

Figure 6:
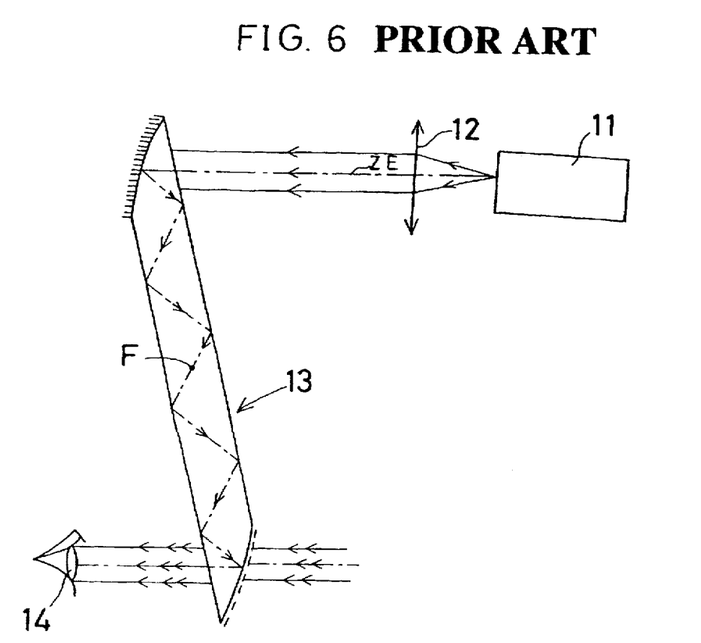
FIG. 6 is a schematic illustrative of one conventional head-mounted image display device.

For instance, JP-A-2-297516 discloses an optical system made up of a 2D display device 11 for displaying images, an objective collimating lens 12 and a parallel transparent plate 13 having off-axis paraboloidal mirrors on both its ends, as shown in FIG. 6. Light beams leaving the 2D display device 11 for displaying images are converted by the objective collimating lens 12 into parallel beams, which are then subjected to first transmission through a parallel surface of the parallel transparent plate 13, reflection at the first paraboloidal mirror, some total reflections within the parallel transparent plate 13, reflection at the second paraboloidal mirror and second transmission through the parallel surface of the parallel transparent plate 13 (8 reflections and 2 transmissions), whereby an intermediate image is formed on a point F for projection into an observer's eyeball 14.

U.S. Pat. No. 4,026,641 discloses an optical system wherein, as shown in FIG. 7, a image of an image display element 11 is converted by a transmission optical element 15 into a curved object image, which is in turn projected from a toric surface 16 into an observer's eyeball 14.

A problem associated with an image display device of the type wherein an image thereof is relayed as shown in FIG. 6 is, however, that it needs not only an ocular optical system, but also a relay optical system, resulting in increases in the size and weight of the whole optical system as well as an increase in the amount of extension of the whole optical system from a person's head or face. Therefore it is not fit for a head-mounted or face-mounted image display device.

The optical system for forming parallel beams as an intermediate image as well as the optical system for projecting an intermediate image into an eyeball produce some considerable aberrations because only the paraboloidal mirrors that have power.

Figure 7:
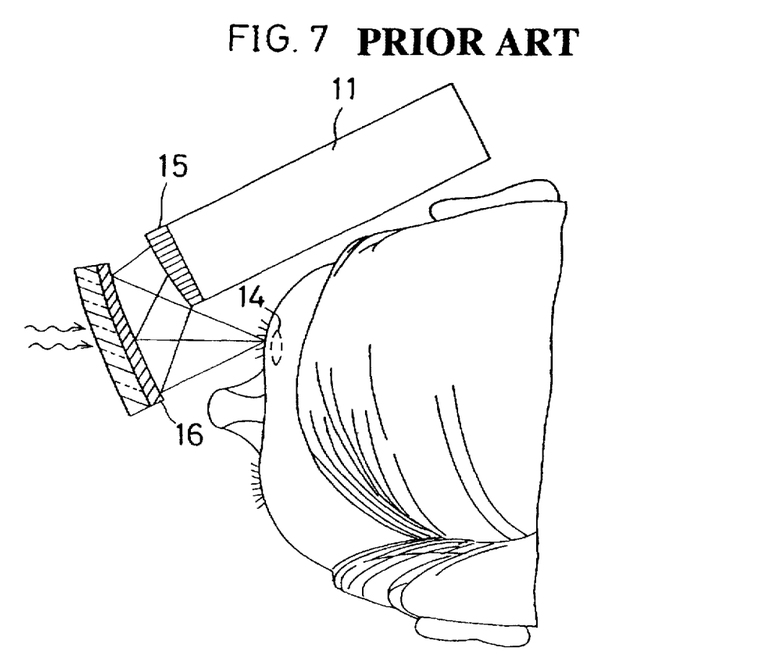
FIG. 7 is a schematic illustrative of another conventional head-mounted display device.

The ocular optical system composed of a concave mirror, as shown in FIG. 7, also produces some considerable aberrations and so is detrimental to image quality, even though the concave mirror is defined by a toric surface as shown in FIG. 7.

To correct for field curvature occurring at the ocular optical system, therefore, it is required to use the transmission optical element 15 such as a fiber plate. Even by use of the transmission optical system 15 and toric surface 16, however, it is impossible to make adequate correction for coma, and other aberrations.

SUMMARY OF THE INVENTION

In view of such problems associated with the prior art as mentioned above, an object of the present invention is to provide an ocular optical system designed to form no intermediate image, especially, an ocular optical system which is compact and light in weight with well corrected aberrations, and so is best suited for use on a head- or face-mounted image display device.

To achieve the aforesaid object, the present invention provides an ocular optical system comprising at least three juxtaposed optical surfaces, characterized in that at least two optical surfaces of said at least three optical surfaces are defined by curved surfaces which are concave on a pupil position side of said optical system and at least four reflections occur between said curved surfaces.

In this case, it is desired that a space defined by said at least three surfaces be filled with a transparent medium having a refractive index greater than 1.

It is also desired that an image display element be located on an object surface of said ocular optical system, and that a display surface of said image display element be directed to a side opposite to said pupil position.

An account will now be given of why the aforesaid arrangement is used in the present invention and how it works.

The present invention is concerned with an optical system layout needed for locating an ocular optics system in a compact manner. In other words, making the ocular optical system is important for making, for instance, an image display device on which it is used thin. By making the display device thin, it is possible to reduce the moment of inertia even at the same weight because the center of gravity comes close to the center of an observer's head. In short, the ability of the display device to follow the movement of the observer's head is much improved.

According to the present invention, therefore, there is provided an ocular optical system designed to project an image of an image display element directly into an observer's eyeball without recourse to any relay optical system.

According to the present invention, the ocular optical system can successfully be made thin by allowing light rays to reciprocate therein, thereby defining a turn-back optics path.

It should here be noted that only by use of a turn-back optics path it is impossible to achieve a wide-enough viewing angle. For this reason, it is essentially important that at least two reflecting surfaces are defined by curved surfaces concave on the pupil position side of the optical system, and that light rays reflect between the curved surfaces while a light beam converges simultaneously with repeated reflection within the ocular optical system.

In other words, reflecting surfaces of concave mirrors, convex mirrors or the like are more reduced than refracting surfaces having the same power in terms of the quantity of aberrations generated, and do not give rise to chromatic aberration at all. The use of three or more reflecting surfaces having power enables the power to be so dispersed that projection can be achieved with more reduced aberrations if the power is on the same level. By properly locating concave and convex mirrors at proper intervals it is additionally possible to keep aberrations in a good state because field curvature, spherical aberration and other aberrations generated at the reflecting surfaces of those concave and convex mirrors can be offset with one another.

If there is provided a turn-back optics path allowing at least four reflections to occur between those mirrors, it is then possible to make the optical system compact and thin.

If two of at least three optical surfaces are located with their concave surfaces directed to the observer's eyeball located on the pupil position side of the optical system, it is then possible to obtain, with reduced coma, an observed image which has high resolution yet is clear over its whole length and breadth.

If the space defined by the aforesaid three surfaces is filled with a medium having a refractive index greater than 1, it is then possible to construct the reflecting surfaces of back-surface mirrors and, hence, reduce the occurrence of coma and spherical aberration. This is because back-tracing light rays from the pupil converge upon being transmitted through the second transmitting surface (a second transmitting surface as counted from the image display element side) whereby the diversion of light rays within the optical system is more reduced as compared with an optical system defined by surface mirrors when making sure of the same viewing angle, so that it is possible to reduce aberrations generated at the reflecting surfaces and, at the same time, to make the optical system compact without giving rise to any shading of light rays.

When the ocular optical system of this invention is used with an image display device, it is desired that the image display element be located on the object surface of the ocular optics system with its display surface located on the opposite side of the pupil position. It is then possible to reduce the proximal-to-distal thickness of the optical system from the pupil in the optical axis direction. This in turn makes it possible to reduce the amount of extension of the optical system from the observer's face upon being built in an image display device.

If at least three optical surfaces are all arranged with their concave surfaces located on the pupil position side of the optical system, it is then possible to obtain, with much more reduced coma, an observed image which has high resolution yet is clear over its whole length and breadth.

Further, it is desired that an optical axis emerging from the object surface of the ocular optics system progresses in the order of a first transmitting surface, a first reflecting surface, a second reflecting surface, a third reflecting surface, a fourth reflecting surface, a fifth reflecting and a second transmitting surface. This ensures that at least five reflections occur at the first to fifth reflecting surfaces while the optical axis emerges from the second transmitting surface via the first transmitting surface, so making it possible to construct all the reflecting surfaces of back-surface mirrors and, at the same time, to turn back the optical path reciprocally.

If the curvatures of at least three optical surfaces within their decenteration planes and within planes perpendicular thereto are changed, it is then possible to correct for astigmatism occurring at decentered concave mirrors.

If the first transmitting surface and the second reflecting surface are made up of surfaces of the same shape at the same location, it is then possible to facilitate the fabrication of the ocular optical system because the number of surface shapes needed therefor is reduced.

Similarly, if the fourth reflecting surface and the second transmitting surface are made up of surfaces of the same shape at the same location, it is then possible to facilitate the fabrication of the ocular optics system because the number of surface shapes needed therefor is reduced.

If the second and fourth reflecting surfaces are made up of surfaces of the same shape at the same location, it is then possible to make the fabrication of the ocular optical system easier because the number of surface shapes needed therefor is reduced.

If the first transmitting surface, the second and fourth reflecting surfaces and the second transmitting surface are made up of surfaces of the same shape at the same location, it is then possible to make the fabrication of the ocular optical system easier because the number of surface shapes needed therefor is much more reduced.

If the first and third reflecting surfaces are made up of surfaces of the same shape at the same location, it is then possible to make the fabrication of the ocular optical system easier because the number of surface shapes needed therefor is much more reduced.

If the first transmitting surface, the second and fourth reflecting surfaces and the second transmitting surface are made up of surfaces of the same shape at the same location, and if the first and third reflecting surfaces are made up of surfaces of the same shape at the same location, it is then possible to facilitate make the fabrication of the ocular optical system because the number of surface shapes needed therefor is reduced.

If an image display element is located on the object surface of the ocular optical system with a locating means provided to locate the observer's eyeball on the pupil position, it is then possible to construct an image display device of small size.

If a locating means is provided to locate the image display element and the ocular optical system on an observer's head so that they can be mounted together on the observer's head, it is then possible for the observer to view images in a free position or direction. In short, the observer can view images in a comfortable position. For instance, even a bedridden, ill person can view images in a bedridden position if the image display device is worn on the person's head. It is thus possible to construct a head-mounted image display device of small size.

If an image pickup means is located on the object surface of the ocular optical system with a stop positioned at the pupil position, it is then possible to provide an image pickup optical system of small size, and by the addition thereto of function capable of forming an image of an object at infinity, it is further possible to provide an image optical system such as a finder optical system used on video cameras or the like.

Of course, in this case, the ocular optical system of this invention is usable as part of microscopes, telescopes, endoscopes, and so on.

By constructing the second reflecting surface of a convex mirror concave on the observer's eyeball side, it is further possible to cancel field curvature and other aberrations generated at the first and third reflecting surfaces, and so reduce the quantity of aberrations generated over the ocular optical system.

By constructing the first, third and fifth reflecting surfaces of concave mirrors concave on the pupil side and the second and fourth reflecting mirrors of convex mirrors concave on the pupil side, it is further possible to achieve a positive/negative/positive/negative/positive power layout favorable for correcting for coma, field curvature and other aberrations.

If the second reflecting surface is designed such that light rays are incident thereon at an angle of incidence exceeding the critical angle, the light rays are then reflected at the second reflecting surface in the form of total reflection so that a reflectance of 100% can obtained. This in turn enables light loss in an observed image to be reduced and make the observed image bright. This also enables the reflecting and transmitting regions to be superposed on each other so that the optical system can be made to be compact.

It is particularly preferable to construct the optical system with a single optical element because the optical system can have three actions, viz., "first transmitting action upon incidence on the optical element", "five reflections within the optical element", and "second transmitting action upon emanating from the optical element". Thus, the use of a single optical element can simplify the fabrication of the ocular optical system.

If the second and fourth reflecting mirrors are designed such that light rays are incident thereon at an angle of incidence exceeding the critical angle, the light rays are then reflected at the second and fourth reflection surfaces in the form of total reflection. This in turn enables light loss in an observed image to be reduced and make the observed image bright. This also enables the reflecting and transmitting regions to be superposed on each other so that the optical system can be made compact.

Of importance in this invention is that the ocular optical system satisfies the following condition (1):

$$70° < \theta_2 < 100° \quad (1)$$

with the proviso that a light ray leaving the center of an object point and arriving at the center of the pupil defines a principal ray. Here $\theta_2$ represents an angle which the principal ray incident on the second reflecting surface makes with the principal ray emerging therefrom. This condition is provided to determine the longitudinal size of the optical system. At an angle smaller than the lower-limit angle of 70°, the first transmitting surface and second reflecting surface of the optical system interfere with each other, so rendering it impossible to make sure of any wide viewing angle. At an angle exceeding the upper-limit angle of 100° it is difficult to make the optical system compact because its longitudinal size becomes large.

Of importance in this invention is also that the ocular optics system satisfies the following condition (2):

$$110° < \theta_4 < 160° \quad (2)$$

where $\theta_4$ represents an angle which the principal ray incident on the fourth reflecting surface makes with the principal ray emerging therefrom. This condition is again provided to determine the longitudinal size of the optical system. At an angle smaller than the lower-limit angle of 110°, the first transmitting surface and fourth reflecting surface of the optical system interfere with each other, so rendering it impossible to make sure of any wide viewing angle. At an angle exceeding the upper-limit angle of 160° it is difficult to make the optical system compact because its longitudinal size becomes large.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 3 of the image display device constructed using the ocular optics system according to the present invention will now be explained with reference to the accompanying drawings.

Figure 1:
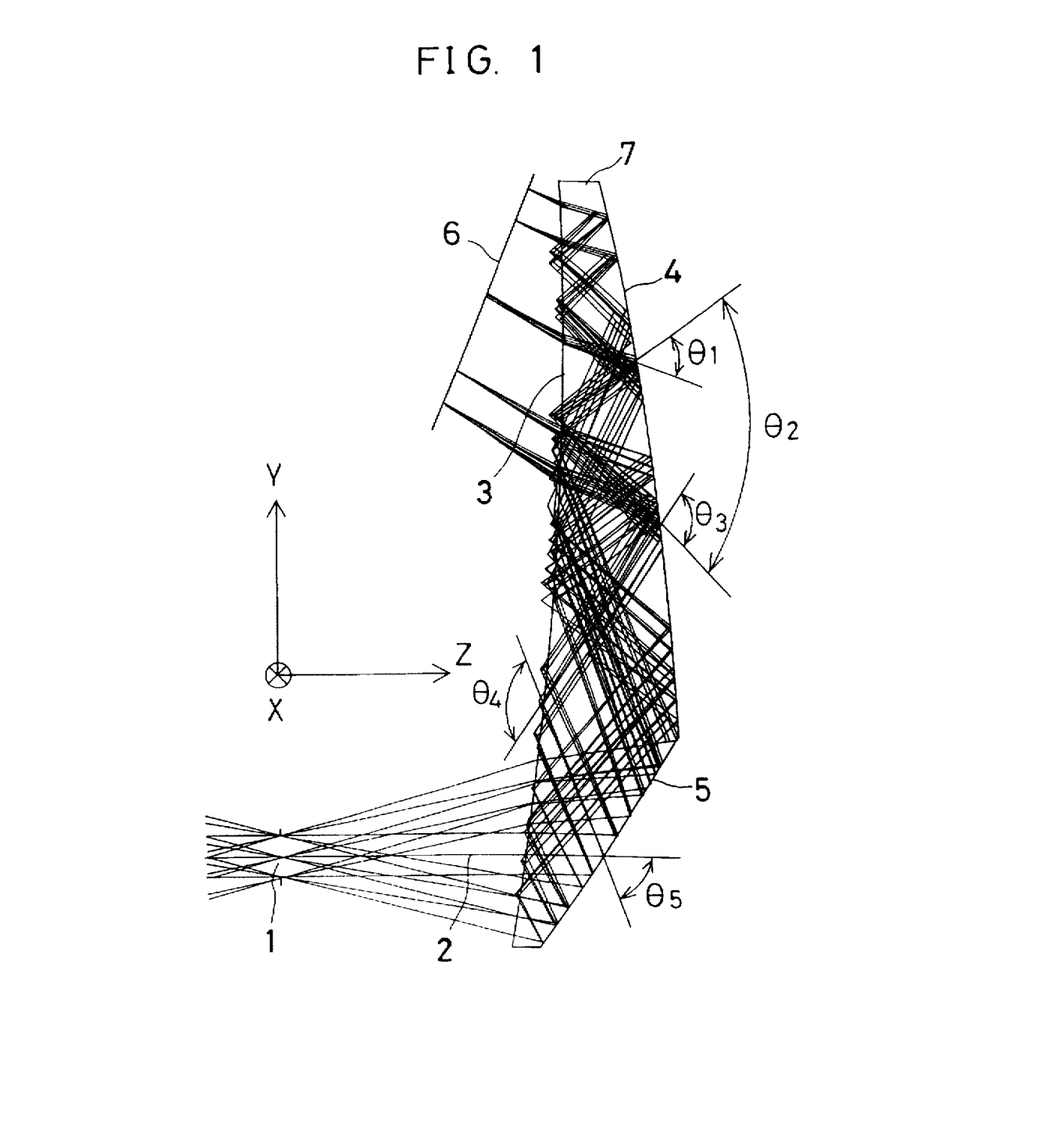
FIG. 1 is a sectional view illustrative of Example 1 of an image display device making use of the ocular optical system according to the present invention.

Constitutional parameters of each example will now be given later. In what follows, surface numbers are given by back-tracing surfaces numbers as counted from an observer's pupil position 1 toward an image display element 6. As shown in FIG. 1, a coordinate system is composed of the origin defined by an observer's iris position 1, a Z axis defined by an observer's visual axis 2, whose direction from the origin toward an ocular optical system 7 is taken as being positive, a Y axis perpendicular to the observer's visual axis 2, whose direction from below to above with respect to an observer's eyeball is taken as being positive, and an X axis perpendicular to the observer's visual axis 2, whose direction from right to left with respect to the observer's eyeball is taken as being positive. In other words, a Y–Z plane is defined within a sheet plane of FIG. 1 while an X–Z plane is defined by a plane perpendicular to the sheet plane. An optical axis is here assumed to be turned back within the Y–Z plane on the sheet plane.

Of the constitutional parameters to be described later, Y, Z and θ represent amounts of decentration of a vertex of a given surface from the reference surface (pupil position 1) in the Y and Z axis directions and an angle of inclination of a center axis of that given surface from the Z axis, respectively. Note that the plus sign attached to θ means the direction of counterclockwise rotation, and that the surface separation is of no significance.

For each surface, an irrotationally symmetric aspheric shape is given by $$Z = [(X^2 Rx) + (Y^2/Ry)]/[1 + \{1 - (1+Kx)(X^2/Rx^2) - (1+Ky)(Y^2/Ry^2)\}^{1/2}] + AR[(1-AP)X^2 + (1+AP)Y^2]^2 + BR[(1-BP)X^2 + (1+BP)Y^2]^3$$

where, on the coordinates defining that surface, Ry and Rx are the paraxial radii of curvature of the aspheric surface within the Y–Z plane (sheet plane) and the X–Z plane, respectively, Kx and Ky are the conical coefficients of the aspheric surface within the X–Z plane and the Y–Z plane, respectively, AR and BR are the fourth- and sixth-order aspheric coefficients of the aspheric surface which is rotationally symmetric with respect to the Z axis, respectively, and AP and BP are the fourth- and sixth-order aspheric coefficients of the aspheric surface which is irrotationally symmetric with respect to the Z axis, respectively.

It is here to be noted that the refractive index of a medium between surfaces is given by a d-line refractive index, and that length is given in units of millimeters.

In the constitutional parameters to be described later, back-tracing is carried out from an object point position of a virtual image positioned 1-meter away from the pupil.

Figure 2:
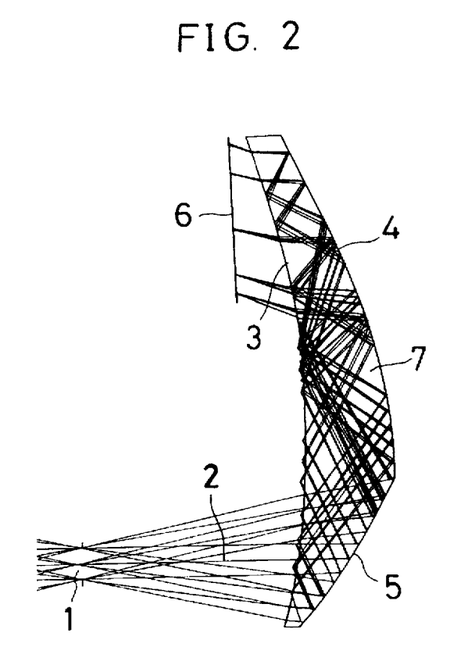
FIG. 2 is a sectional view illustrative of Example 2 of the image display device making use of the ocular optics system according to the present invention.
Figure 3:
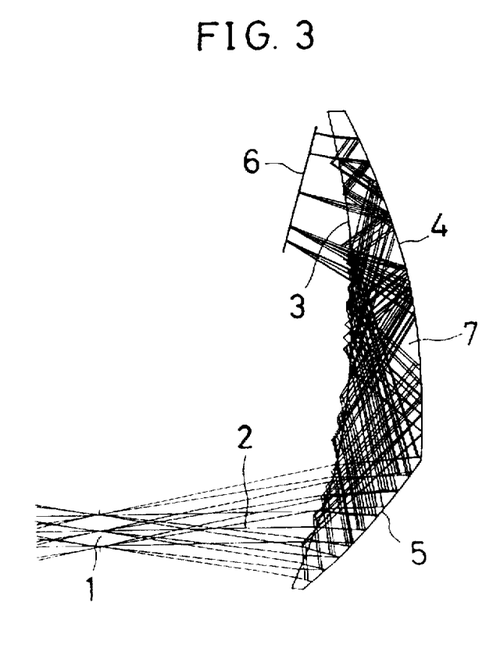
FIG. 3 is a sectional view illustrative of Example 3 of the image display device making use of the ocular optical system according to the present invention.

FIGS. 1, 2 and 3 are sectional views of Examples 1, 2 and 3 of a monocular image display device. In these drawings, reference numeral 1 stands for an observer's pupil position, 7 an ocular optical system, 2 an observer's visual axis, 3 a first surface of the ocular optical system 7, 4 a second surface of the ocular optical system 7, 5 a third surface of the ocular optical system, and 6 an image display element.

Referring to actual optical paths in these examples, a pencil of light emanating from the image display element 6 is first incident on the ocular optical system 7 upon being refracted at the first surface 3 thereof, then is internally reflected at the second surface 4, the first surface 3, the second surface 4, the first surface 3 and the third surface 5 in the described order, then incident on the first surface 3 where it is refracted, and finally projected into an observer's eyeball while the iris position of the observer's pupil or the center of rotation of the observer's eyeball is taken as the exit pupil 1.

Horizontal and vertical field angles, and pupil diameter are 18.75° and 25°, and 8 mm for Example 1; 22.5° and 30°, and 4 mm for Example 2; and 30° and 22.5°, and 4 mm for Example 3.

Throughout the examples, the surfaces are all anamorphic aspheric surfaces, and the first transmitting surface, second reflecting surface, fourth reflecting surface and second transmitting surface comprise the common first surface 3 while the first reflecting surface and third reflecting surface comprise the common second surface 4.

It should be noted that the ocular optical system of this invention is usable as an image optical system capable of forming an image of an object point at a distant place.

Enumerated below are the values of the constitutional parameters in Examples 1, 2 and 3. It is to be noted, however, that $\theta_1$ to $\theta_5$ represent angles which, as shown in FIG. 2, the principal ray—defined by a light ray leaving the center of the image display element 6 and arriving at the center of the pupil 1—incident on the first to fifth reflecting surfaces makes with the principal ray emerging therefrom.

EXAMPLE 1

| Surface No. | | Radius of curvature | Surface separation | Refractive index (Displacement) | | Abbe's No. (Tilt angle) |
|---|---|---|---|---|---|---|
| 1 | | ∞ (pupil) | | | | |
| 2 | $R_y$ | −427.518 | | 1.51633 | | 64.1 |
|   | $R_x$ | −29.212 | Y | 17.473 | θ | −5.351° |
|   | $K_y$ | 0 | Z | 26.387 | | |
|   | $K_x$ | 0 | | | | |
|   | AR | 0 | | | | |
|   | BR | 0 | | | | |
|   | AP | 0 | | | | |
|   | BP | 0 | | | | |
| 3 | $R_y$ | −254.887 | | 1.51633 | | 64.1 |
|   | $R_x$ | −649.767 | Y | 130.176 | θ | 12.443° |
|   | $K_y$ | 0 | Z | 52.819 | | |
|   | $K_x$ | 0 | | | | |
|   | AR | −0.876797 × 10$^{-6}$ | | | | |
|   | BR | 0 | | | | |
|   | AP | −0.713380 | | | | |
|   | BP | 0 | | | | |
| 4 | $R_y$ | −427.518 | | 1.51633 | | 64.1 |
|   | $R_x$ | −29.212 | Y | 17.473 | θ | −5.351° |
|   | $K_y$ | 0 | Z | 26.387 | | |
|   | $K_x$ | 0 | | | | |
|   | AR | 0 | | | | |
|   | BR | 0 | | | | |
|   | AP | 0 | | | | |
|   | BP | 0 | | | | |
| 5 | $R_y$ | −242.504 | | 1.51633 | | 64.1 |
|   | $R_x$ | −42.527 | Y | −31.772 | θ | −8.869° |
|   | $K_y$ | 0 | Z | 36.510 | | |
|   | $K_x$ | 0 | | | | |
|   | AR | 0 | | | | |
|   | BR | 0 | | | | |
|   | AP | 0 | | | | |
|   | BP | 0 | | | | |
| 6 | $R_y$ | −427.518 | | 1.51633 | | 64.1 |
|   | $R_x$ | −29.212 | Y | 17.473 | θ | −5.351° |
|   | $K_y$ | 0 | Z | 26.387 | | |
|   | $K_x$ | 0 | | | | |
|   | AR | 0 | | | | |
|   | BR | 0 | | | | |
|   | AP | 0 | | | | |
|   | BP | 0 | | | | |
| 7 | $R_y$ | −242.504 | | 1.51633 | | 64.1 |
|   | $R_x$ | −42.527 | Y | −31.772 | θ | −8.869° |
|   | $K_y$ | 0 | Z | 36.510 | | |
|   | $K_x$ | 0 | | | | |
|   | AR | 0 | | | | |
|   | BR | 0 | | | | |
|   | AP | 0 | | | | |
|   | BP | 0 | | | | |
| 8 | $R_y$ | −427.518 | | 1.51633 | | 64.1 |
|   | $R_x$ | −29.212 | Y | 17.473 | θ | −5.351° |
|   | $K_y$ | 0 | Z | 26.387 | | |
|   | $K_x$ | 0 | | | | |
|   | AR | 0 | | | | |
|   | BR | 0 | | | | |
|   | AP | 0 | | | | |
|   | BP | 0 | | | | |
| 9 | | (display device) | Y | 55.708 | θ | −22.615° |
|   | | | Z | 21.266 | | |

$\theta_1 = 45°$
$\theta_2 = 76°$
$\theta_3 = 94°$
$\theta_4 = 128°$
$\theta_5 = 65°$

EXAMPLE 2

| Surface No. | | Radius of curvature | Surface separation | Refractive index (Displacement) | | Abbe's No. (Tilt angle) |
|---|---|---|---|---|---|---|
| 1 | | ∞ (pupil) | | | | |
| 2 | $R_y$ | −152.846 | | 1.51633 | | 64.1 |
|   | $R_x$ | −66.891 | Y | −13.768 | θ | −13.419° |
|   | $K_y$ | 0 | Z | 27.500 | | |
|   | $K_x$ | 0 | | | | |
|   | AR | −0.178178 × 10$^{-8}$ | | | | |
|   | BR | −0.594362 × 10$^{-11}$ | | | | |
|   | AP | 0.105146 × 10 | | | | |
|   | BP | 0.664504 | | | | |
| 3 | $R_y$ | −119.363 | | 1.51633 | | 64.1 |
|   | $R_x$ | −82.534 | Y | 47.793 | θ | 6.177° |
|   | $K_y$ | 0 | Z | 54.768 | | |
|   | $K_x$ | 0 | | | | |
|   | AR | −0.190871 × 10$^{-6}$ | | | | |
|   | BR | 0.305496 × 10$^{-11}$ | | | | |
|   | AP | 0.660695 × 10$^{-1}$ | | | | |
|   | BP | 0.487236 | | | | |
| 4 | $R_y$ | −152.846 | | 1.51633 | | 64.1 |
|   | $R_x$ | −66.891 | Y | −13.768 | θ | −13.419° |
|   | $K_y$ | 0 | Z | 27.500 | | |
|   | $K_x$ | 0 | | | | |
|   | AR | −0.178178 × 10$^{-8}$ | | | | |
|   | BR | −0.594362 × 10$^{-11}$ | | | | |
|   | AP | 0.105146 × 10 | | | | |
|   | BP | 0.664504 | | | | |

-continued

| Surface No. | | Radius of curvature | Surface separation | Refractive index (Displacement) | | Abbe's No. (Tilt angle) |
|---|---|---|---|---|---|---|
| 5 | $R_y$ | −118.626 | | 1.51633 | | 64.1 |
|   | $R_x$ | −82.339 | Y | −26.271 | θ | −14.237° |
|   | $K_y$ | 0 | Z | 40.718 | | |
|   | $K_x$ | 0 | | | | |
|   | AR | −0.122336 × 10$^{-7}$ | | | | |
|   | BR | −0.514035 × 10$^{-12}$ | | | | |
|   | AP | −0.263241 × 10 | | | | |
|   | BP | 0.831265 | | | | |
| 6 | $R_y$ | −152.846 | | 1.51633 | | 64.1 |
|   | $R_x$ | −66.891 | Y | −13.768 | θ | −13.419° |
|   | $K_y$ | 0 | Z | 27.500 | | |
|   | $K_x$ | 0 | | | | |
|   | AR | −0.178178 × 10$^{-8}$ | | | | |
|   | BR | −0.594362 × 10$^{-11}$ | | | | |
|   | AP | 0.105146 × 10 | | | | |
|   | BP | 0.664504 | | | | |
| 7 | $R_y$ | −118.626 | | 1.51633 | | 64.1 |
|   | $R_x$ | −82.339 | Y | −26.271 | θ | −14.237° |
|   | $K_y$ | 0 | Z | 40.718 | | |
|   | $K_x$ | 0 | | | | |
|   | AR | −0.122336 × 10$^{-7}$ | | | | |
|   | BR | −0.514035 × 10$^{-12}$ | | | | |
|   | AP | −0.263241 × 10 | | | | |
|   | BP | 0.831265 | | | | |
| 8 | $R_y$ | −152.846 | | 1.51633 | | 64.1 |
|   | $R_x$ | −66.891 | Y | −13.768 | θ | −13.419° |
|   | $K_y$ | 0 | Z | 27.500 | | |
|   | $K_x$ | 0 | | | | |
|   | AR | −0.178178 × 10$^{-8}$ | | | | |
|   | BR | −0.594362 × 10$^{-11}$ | | | | |
|   | AP | 0.105146 × 10 | | | | |
|   | BP | 0.664504 | | | | |
| 9 | | (display device) | Y | 45.606 | θ | −1.625° |
|   | | | Z | 22.237 | | |

$\theta_1 = 52°$
$\theta_2 = 85°$
$\theta_3 = 87°$
$\theta_4 = 124°$
$\theta_5 = 66°$

EXAMPLE 3

| Surface No. | | Radius of curvature | Surface separation | Refractive index (Displacement) | | Abbe's No. (Tilt angle) |
|---|---|---|---|---|---|---|
| 1 | | ∞ (pupil) | | | | |
| 2 | $R_y$ | −95.092 | | 1.51633 | | 64.1 |
|   | $R_x$ | −36.857 | Y | 36.645 | θ | −1.558° |
|   | $K_y$ | 0 | Z | 36.258 | | |
|   | $K_x$ | 0 | | | | |
|   | AR | 0.939620 × 10$^{-8}$ | | | | |
|   | BR | 0.455727 × 10$^{-17}$ | | | | |
|   | AP | −0.110527 × 10$^{-1}$ | | | | |
|   | BP | −0.168168 × 10$^{-12}$ | | | | |
| 3 | $R_y$ | −106.440 | | 1.51633 | | 64.1 |
|   | $R_x$ | −60.074 | Y | 27.597 | θ | −22.699° |
|   | $K_y$ | 0 | Z | 55.143 | | |
|   | $K_x$ | 0 | | | | |
|   | AR | −0.405140 × 10$^{-6}$ | | | | |
|   | BR | 0.141026 × 10$^{-18}$ | | | | |
|   | AP | 0.318736 × 10$^{-2}$ | | | | |
|   | BP | 0.285034 × 10$^{-12}$ | | | | |
| 4 | $R_y$ | −95.092 | | 1.51633 | | 64.1 |
|   | $R_x$ | −36.857 | Y | 36.645 | θ | 1.558° |
|   | $K_y$ | 0 | Z | 36.258 | | |
|   | $K_x$ | 0 | | | | |
|   | AR | 0.939620 × 10$^{-8}$ | | | | |
|   | BR | 0.455727 × 10$^{-17}$ | | | | |
|   | AP | −0.110527 × 10$^{-1}$ | | | | |
|   | BP | −0.168168 × 10$^{-12}$ | | | | |
| 5 | $R_y$ | −84.273 | | 1.51633 | | 64.1 |
|   | $R_x$ | −49.707 | Y | 35.482 | θ | 11.744° |
|   | $K_y$ | 0 | Z | 43.297 | | |
|   | $K_x$ | 0 | | | | |
|   | AR | 0.708627 × 10$^{-7}$ | | | | |
|   | BR | −0.117003 × 10$^{-15}$ | | | | |
|   | AP | 0.721109 × 10$^{-1}$ | | | | |
|   | BP | −0.112555 × 10$^{-11}$ | | | | |
| 6 | $R_y$ | −95.092 | | 1.51633 | | 64.1 |
|   | $R_x$ | −36.857 | Y | 36.645 | θ | 1.558° |
|   | $K_y$ | 0 | Z | 36.258 | | |
|   | $K_x$ | 0 | | | | |
|   | AR | 0.939620 × 10$^{-8}$ | | | | |
|   | BR | 0.455727 × 10$^{-17}$ | | | | |
|   | AP | −0.110527 × 10$^{-1}$ | | | | |
|   | BP | −0.168168 × 10$^{-12}$ | | | | |
| 7 | $R_y$ | −84.273 | | 1.51633 | | 64.1 |
|   | $R_x$ | −49.707 | Y | 35.482 | θ | 11.744° |
|   | $K_y$ | 0 | Z | 43.297 | | |
|   | $K_x$ | 0 | | | | |
|   | AR | 0.708627 × 10$^{-7}$ | | | | |
|   | BR | −0.117003 × 10$^{-15}$ | | | | |
|   | AP | 0.721109 × 10$^{-1}$ | | | | |
|   | BP | −0.112555 × 10$^{-11}$ | | | | |
| 8 | $R_y$ | −95.092 | | | | |
|   | $R_x$ | −36.857 | Y | 36.645 | θ | 1.558° |
|   | $K_y$ | 0 | Z | 36.258 | | |
|   | $K_x$ | 0 | | | | |
|   | AR | 0.939620 × 10$^{-8}$ | | | | |
|   | BR | 0.455727 × 10$^{-17}$ | | | | |
|   | AP | −0.110527 × 10$^{-1}$ | | | | |
|   | BP | −0.168168 × 10$^{-12}$ | | | | |
| 9 | | (display device) | Y | 46.315 | θ | −16.589° |
|   | | | Z | 28.915 | | |

$\theta_1 = 56°$
$\theta_2 = 86°$
$\theta_3 = 98°$
$\theta_4 = 138°$
$\theta_5 = 73°$ In the aforesaid examples the anamorphic surfaces are used; however, it should be understood that use may be made of any desired surfaces inclusive of toric surfaces, rotationally symmetric surfaces, spherical surfaces, or free curved surfaces represented by the following equation:

$$Z = \sum_{n=0}^{k} \sum_{m=0}^{k'} C_{nm} x^m y^{n-m}$$

where x, y and z represent orthogonal coordinates. $C_{nm}$ is an arbitrary constant, and k and k' are arbitrary constants.

It should also be understood that use may be made of such holographic surfaces as set forth in JP-A-7-104209.

For surfaces that cannot be defined in terms of curvature, power, etc., it is possible to determine their curvature and power by finding the curvature of a certain region obtained by differentiation of the shape of a surface portion coming in contact with an axial light ray propagating on the visual axis and arriving at the image display element along that axial light ray.

Figure 4:
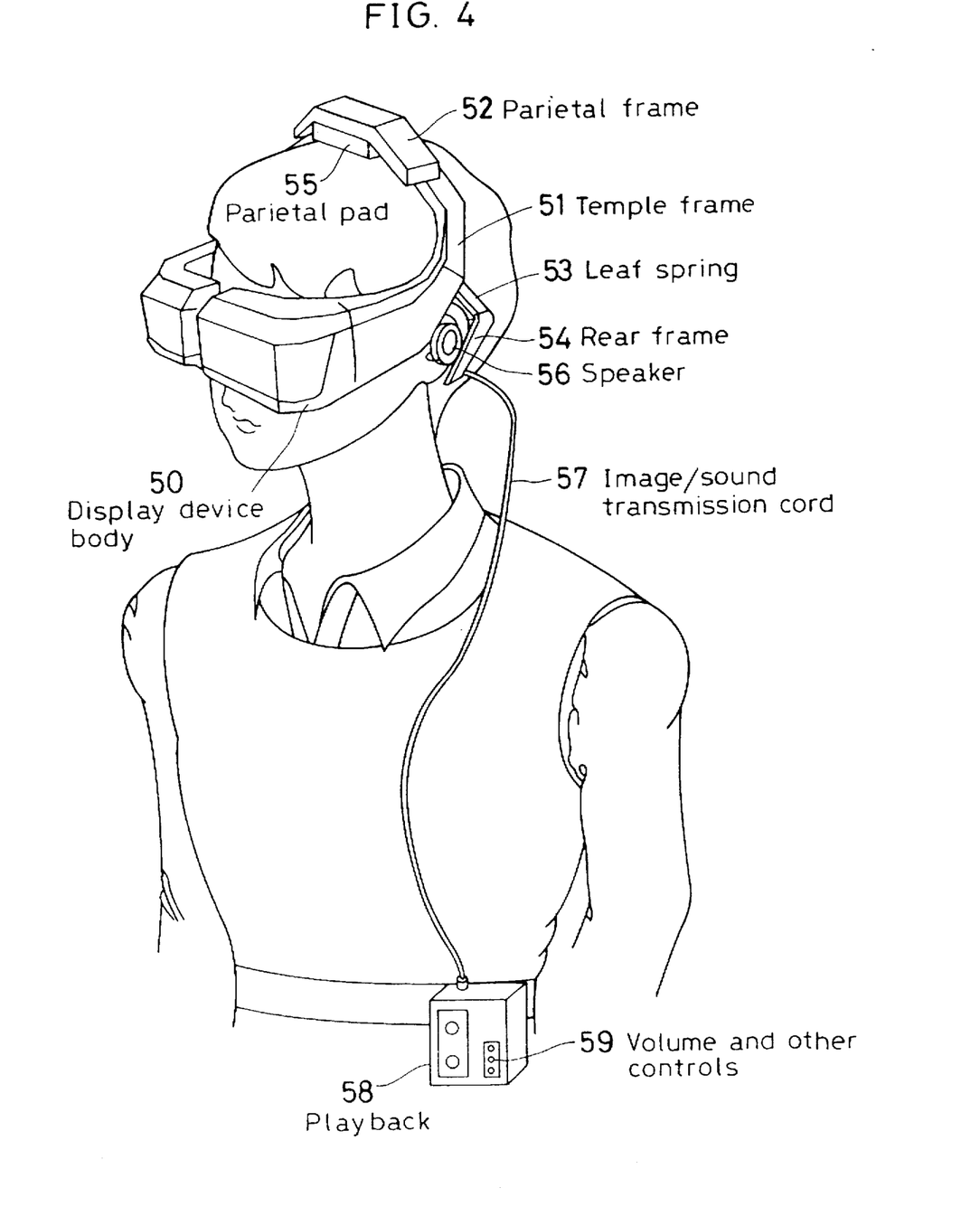
FIG. 4 is a schematic illustrative of one exemplary general construction of a portable type of image display device making use of the ocular optical systems according to the present invention.
Figure 5:
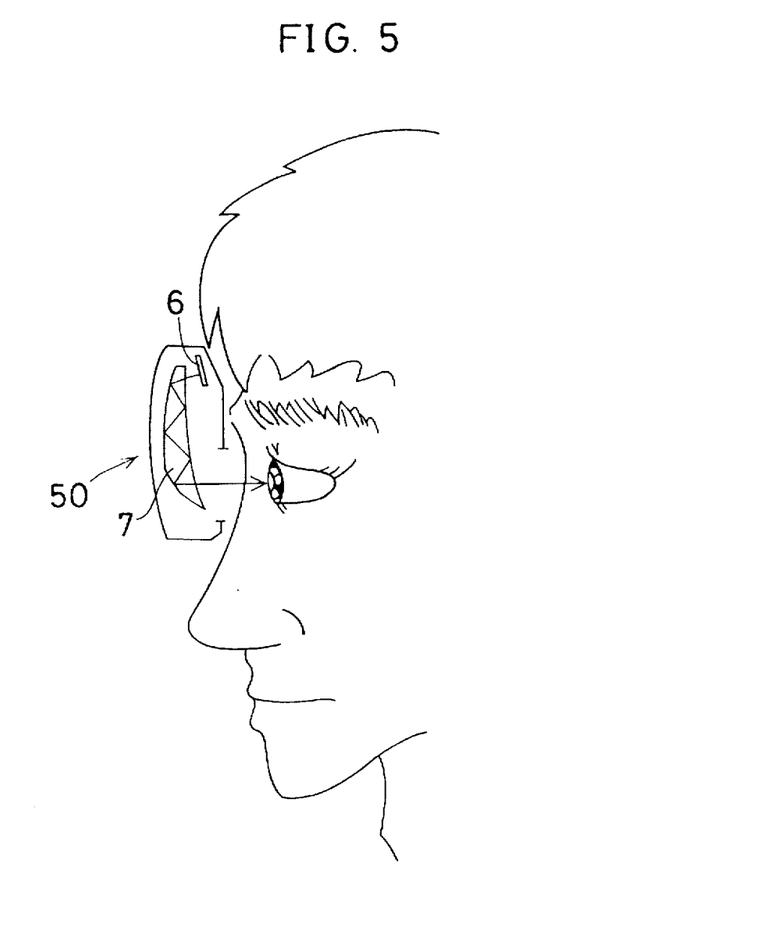
FIG. 5 is a sectional view illustrative of one optical system shown in FIG. 4.

Such an ocular optical system according to this invention is used with an image display element in a set-up form. Two such sets are supported while they are spaced away from each other by an interpupillary distance to thereby construct a portable type of image display device such as a fixed or head-mounted type of image display device which one can use to view images with both eyes. It should be understood that one such set may be used in the form of a monocular image display device. One exemplary general construction of such a portable image display device is shown in FIG. 4, and a section of one such set intended for use with one eye of an observer is illustrated in FIG. 5. As shown in FIG. 5, a display device body 50 includes a pair of two such sets of ocular optics systems 7 in association of which an image display element 6 comprising an LCD is located on an image surface. As shown in FIG. 4, the device body 50 is provided on both the temples with continuous temple frames 51, which are connected to each other via a parietal frame 52. Between the temple frames 51 there is located a rear frame 54 via a leaf spring 53. The rear frame 54 is engaged with the rear sites of both the ears of the observer, as is the case with the bows of glasses, while the display device body 50 is mounted on the head of the observer, whereby the display device 50 can be well held in front of the eyes of the observer. It is here to be noted that a parietal pad 55 formed of an elastic material such as sponge is contained in the inside of the parietal frame 52 and a similar pad is contained in the inside of the rear frame 54 as well, so that the observer can comfortably wear this display device on his or her head.

The rear frame 54 is additionally provided with a speaker 56 to enable the observer to hear stereophonic sounds while viewing images. The display device body 50, having the speaker 56, may be connected to a playback 58 such as a portable video cassette via an image/sound transmission cord 57, so that the observer can wear the playback 58 on any desired position of a belt or the like to enjoy images with sounds. Reference numeral 59 stands for volume switches or other controls of the playback 58. Note that the parietal frame 52 has built-in electronic parts for image- and sound-processing circuits.

The cord 57 may have a jack at a distal end for connection with an existing video deck or the like. Further, the cord may be connected with a TV wave reception tuner such that the user may watch television or, alternatively, with a computer to receive computer graphics images or message images therefrom. Furthermore, an antenna may be used in place of such an awkward cord to receive external signals via electromagnetic waves.

The principles, and some examples, of the present invention have been described above; however, it is understood that the present invention is in no sense limited to such examples, and many other modifications may be possible.

According to the present invention it is possible to achieve an ocular optical system which, as explained herein at great length, comprises at least three juxtaposed optical surfaces, at least two optical surfaces of said at least three optical surfaces being defined by curved surfaces concave on a pupil position side of said optical system and at least four reflections occurring between said curved surfaces, and so is unlikely to form any intermediate image, is reduced in terms of size and weight with well-corrected aberrations, and is best suited for use on head- or face-mounted image display devices as well.

The entirety of JP-A-8-7363 filed Jan. 19, 1996, from which priority under 35 USC 119 is claimed, is incorporated herein by reference:

What we claim is:

1. An ocular optical system comprising:
   at least three juxtaposed optical surfaces, at least two optical surfaces of said at least three optical surfaces are defined by curved surfaces which are concave on a pupil position side of said ocular optical system and at least four reflections occur between said curved surfaces, wherein said at least four reflections are four combined reflections occurring at said at least two optical surfaces.

2. An ocular optical system comprising:
   at least three juxtaposed optical surfaces, at least two optical surfaces of said at least three optical surfaces are defined by curved surfaces which are concave on a pupil position side of said ocular optical system and at least four reflections occur between said curved surfaces
   wherein said ocular optical system satisfies the following condition:

$$70° < \theta_1 < 100°$$

with the proviso that a light ray leaving a center of an object point and arriving at a center of a pupil defines a principal ray, wherein $\theta_2$ represents an angle which the principal ray incident on a second reflecting surface makes with the principal ray emerging therefrom, as counted in the order of progress of the light ray.

3. An ocular optical system comprising:
   at least three juxtaposed optical surfaces at least two optical surfaces of said at least three optical surfaces are defined by curved surfaces which are concave on a pupil position side of said ocular optical system and at least four reflections occur between said curved surfaces,
   wherein said ocular optical system satisfies the following condition:

$$110° < \theta_4 < 160°$$

with the proviso that a light ray leaving a center of an object point and arriving at a center of a pupil defines a principal ray, wherein $\theta_4$ represents an angle which the principal ray incident on a fourth reflecting surface makes with the principal ray emerging therefrom, as counted in the order of progress of the light ray.

4. An ocular optical system according to claim 1, wherein that a space defined by said at least three surfaces is filled with a transparent medium having a refractive index greater than 1.

5. An ocular optical system according to claim 1, 2, or 3 wherein an image display element is located on an object surface of said ocular optical system, and a display surface of said image display element is directed to a side opposite to said pupil position.

6. An ocular optical system according to claim 1, 2 or 3, wherein said at least three optical surfaces are all concave on the pupil position side of said ocular optical system.

7. An ocular optical system according to claim 1, 2 or 3, wherein an optical axis emerging from an object surface of said ocular optical system progresses in an order of a first transmitting surface, a first reflecting surface, a second reflecting surface, a third reflecting surface, a fourth reflecting surface, a fifth reflecting surface and a second transmitting surface.

8. An ocular optical system according to claim 7, wherein said first transmitting surface and said second reflecting surface are constructed of surfaces of a substantially same shape at a substantially same location.

9. An ocular optical system according to claim 8, wherein said second and fourth reflecting surfaces are constructed of surfaces of a substantially same shape at a substantially same location.

10. An ocular optical system according to claim 7, wherein said first transmitting surface, said second and fourth reflecting surfaces and said second transmitting surface are constructed of surfaces of a substantially same shape at a substantially same location.

11. An ocular optical system according to claim 7, wherein said first and third reflecting surfaces are constructed of surfaces of a substantially same shape at a substantially same location.

12. An ocular optical system according to claim 7, wherein said fourth reflecting surface and said second transmitting surface are constructed of surfaces of a substantially same shape at a substantially same location.

13. An ocular optical system according to claim 12, wherein said second and fourth reflecting surfaces are constructed of surfaces of a substantially same shape at a substantially same location.

14. An ocular optical system according to claim 1, 2 or 3 wherein curvatures of said at least three optical surfaces within planes of decentration thereof are different from those within planes perpendicular thereto.

15. An ocular optical system according to claim 6, wherein said first transmitting surface, said second and fourth reflecting surfaces and said second transmitting surface are constructed of surfaces of a substantially same shape at a substantially same location, and said first and third reflecting surfaces are constructed of surfaces of a substantially same shape at a substantially same location.

16. An ocular optical system according to claim 1, 2 or 3, characterized by being usable as an image pickup optical system by locating an image pickup means on an object surface of said ocular optical system and a stop at a pupil position of said ocular optical system.

17. An image display device, comprising:

an ocular optical system having at least three juxtaposed optical surfaces, at least two optical surfaces of said at least three optical surfaces are defined by curved surfaces which are concave on a pupil position side of said ocular optical system and at least four reflections occur between said curved surfaces;

an image display element located on an object surface of said ocular optical system; and a locating means provided to locate an eyeball of an observer on a pupil position of said ocular optical system, wherein said at least four reflections are four combined reflections occurring at said at least two optical surfaces.

18. An image display device according to claim 17, wherein said ocular optical system satisfies the following condition:

$$70° < \theta_2 < 100°$$

with the proviso that a light ray leaving a center of an object point and arriving at a center of a pupil defines a principal ray, wherein $\theta_2$ represents an angle which the principal ray incident on a second reflecting surface makes with the principal ray emerging therefrom, as counted in the order of progress of the light ray.

19. An image display device according to claim 17, wherein said ocular optical system satisfies the following condition:

$$110° < \theta_4 < 160°$$

with the proviso that a light ray leaving a center of an object point and arriving at a center of a pupil defines a principal ray, wherein $\theta_4$ represents an angle which the principal ray incident on a fourth reflecting surface makes with the principal ray emerging therefrom, as counted in the order of progress of the light ray.

20. A head-mounted image display device, comprising:

an ocular optical system having at least three juxtaposed optical surfaces, at least two optical surfaces of said at least three optical surfaces are defined by curved surfaces which are concave on a pupil position side of said ocular optical system and at least four reflections occur between said curved surfaces;

an image display element located on an object surface of said ocular optical system; and a locating means provided to locate an eyeball of an observer on a pupil position of said ocular optical system, wherein said at least four reflections are four combined reflections occurring at said at least two optical surfaces.

21. A head-mounted image display device according to claim 20, wherein said ocular optical system satisfies the following condition:

$$70° < \theta_2 < 100°$$

with the proviso that a light ray leaving a center of an object point and arriving at a center of a pupil defines a principal ray, wherein $\theta_2$ represents an angle which the principal ray incident on a second reflecting surface makes with the principal ray emerging therefrom, as counted in the order of progress of the light ray.

22. A head-mounted image display device according to claim 20, wherein said ocular optical system satisfies the following condition:

$$110° < \theta_4 < 160°$$

with the proviso that a light ray leaving a center of an object point and arriving at a center of a pupil defines a principal ray, wherein $\theta_4$ represents an angle which the principal ray incident on a fourth reflecting surface makes with the principal ray emerging therefrom, as counted in the order of progress of the light ray.

* * * * *